(12) United States Patent
Ponsini

(10) Patent No.: US 8,874,931 B2
(45) Date of Patent: Oct. 28, 2014

(54) SYSTEM AND METHOD FOR SECURING A USER INTERFACE

(75) Inventor: Nicolas Ponsini, Meudon (FR)

(73) Assignee: Trusted Logic Mobility, Meudon (FR)

( * ) Notice: Subject to any disclaimer, the term of this patent is extended or adjusted under 35 U.S.C. 154(b) by 0 days.

(21) Appl. No.: 13/055,454

(22) PCT Filed: Jul. 23, 2009

(86) PCT No.: PCT/FR2009/000918
§ 371 (c)(1),
(2), (4) Date: Jan. 21, 2011

(87) PCT Pub. No.: WO2010/010258
PCT Pub. Date: Jan. 28, 2010

(65) Prior Publication Data
US 2011/0131423 A1    Jun. 2, 2011

(30) Foreign Application Priority Data

Jul. 23, 2008 (FR) ...................... 08 04192

(51) Int. Cl.
*H04L 29/06* (2006.01)
*G06F 21/82* (2013.01)
*G06F 21/74* (2013.01)
*G06F 21/53* (2013.01)

(52) U.S. Cl.
CPC ............... *G06F 21/82* (2013.01); *G06F 21/74* (2013.01); *G06F 21/53* (2013.01); *G06F 2221/2105* (2013.01)
USPC ........................................................ 713/189

(58) Field of Classification Search
CPC .................................................... G06F 21/85
USPC ........................................................ 713/189
See application file for complete search history.

(56) References Cited

U.S. PATENT DOCUMENTS

2004/0268135 A1    12/2004 Zimmer et al.
2006/0089992 A1    4/2006 Blaho
(Continued)

FOREIGN PATENT DOCUMENTS

WO    WO2008/012567 A    1/2008
WO    WO 2008/012567    *  1/2008    .............. G06F 21/04

OTHER PUBLICATIONS

Cho, Yun Chan and Jeon, Jae Wook. Sharing Data Between Processes Running on Different Domains in Para-Virtualized Xen. International Conference on Control, Automation and Systems 2007. pp. 1255-1260.*

(Continued)

*Primary Examiner* — Jason Gee
(74) *Attorney, Agent, or Firm* — The Jansson Firm; Pehr B. Jansson

(57) ABSTRACT

The invention relates to a method for securing a user interface that comprises a user interface including one or more peripheral hardware devices of the user interface for interaction with said interface, said peripheral hardware devices being driven by driver software, and one or more applications using the user interface. The invention also relates to a method for securing such an interface. The system of the invention is characterised in that the same further comprises a hypervisor and one or more virtual machines, the drivers of the peripheral hardware devices of the user interface being divided into two portions, i.e. a main portion of said drivers under the control of the hypervisor and a front-end portion of said drivers under the control of the virtual machines, wherein the front-end portion of the securing software component is in charge of managing the front-end portion of the drivers and the main portion of the securing software component is in charge of managing the main portion of the drivers. The invention can particularly be used in onboard systems.

12 Claims, 3 Drawing Sheets

(56) References Cited

U.S. PATENT DOCUMENTS

2006/0218409 A1    9/2006  Avraham et al.
2006/0225127 A1*  10/2006  Roberts et al. .................... 726/2

OTHER PUBLICATIONS

Yun Chan Cho et al: "Sharing data between processes funning on different domains in para-virtualized xen" Control, Automation and Systems, 2007. ICCAS '07. International Conference on, IEEE, Piscataway, NJ, USA, Oct. 1, 2007, XP031192980, ISBN:978-89-950038-6-2.

PCT/FR2009/000918 International Search Report, Jan. 21, 2010, European Patent Office, P.B. 5818 Patentlaan 2 NL—2280 HV Rijswijk.

* cited by examiner

SYSTEM AND METHOD FOR SECURING A USER INTERFACE

The invention relates to a system for securing a user interface and a method for securing such an interface.

The user interface is the interface through which the user of an electronic machine such as a computer or embedded system dialogues with that machine. The user interface comprises one or more interface peripheral devices.

There is a variety of interface peripheral devices. Some devices, called input devices, are used to enter information into the machine. Other devices are called output devices, and make it possible to obtain information from the machine. Yet other interface peripheral devices are called input/output devices, and make it possible to enter information into the machine or obtain information from the machine.

Input devices particularly include keypads, mice or other pointing devices, PIN entry pads, smart card readers, graphic tablets or microphones. Output devices particularly include screens or speakers. Lastly, input/output devices particularly include touch screens.

In most cases, the information is presented displayed in pixel mode on a screen, generally in an environment with windows, and the user uses a keyboard and mouse, or the screen itself if it is a touch screen, to interact with the machine. The applications that control the interface then have to process and interpret the information from the user.

For example, when a user wishes to view his/her bank account on the Internet, he/she dialogues with a banking application with the help of a screen and a keypad and/or a mouse. First, the banking application identifies the user by asking him/her to enter his/her customer number. The user then enters his/her customer number with the help of the computer keypad. Then, the banking application authenticates the customer by asking him/her to enter his/her secret access code with the help of the keyboard of their computer and/or the mouse. If the identification and authentication are validated by the banking application, then it displays the statement of the account of the customer on the screen.

Such interactions between the user and the machine are subject to a number of malicious attacks. For example, some of these attacks consist in retrieving the identifier and the secret access code of the customer so that the hacker can view at leisure the accounts of the customer, particularly in order to make illegal transfers.

In practice, two techniques are often used to that end.

The first technique consists in intercepting and recording all the events relating to the input devices and the user interface and, particularly, collecting all the keystrokes by the user on a keypad and/or all the mouse clicks or even mouse movements. In that way, the identifier and access code of the customer are necessarily retrieved by the malicious application.

A second technique consists in taking control of the output devices of the interface and, particularly, taking control of the display on the screen and emulating or simulating the banking application. The customer, who thus believes that he/she are dealing with the genuine banking application, provides his/her identifiers and access codes to the malicious application. These identifiers and codes are retrieved for fraudulent use. Phishing is an example of such fraudulent practices.

To counter the aforementioned malicious attacks, and, generally address the issue of the trustworthiness of the relation with the user interface, there is a known method, using a first approach, of securing the software that drives the devices of the said interface. For instance, this might involve securing the driver of the keyboard and mouse or securing the driver of the graphics card of the screen. The secure drivers may for instance comprise a secret key shared with the driven hardware, so that the information processed by the driver is encrypted and consequently not accessible in clear form to malicious applications.

However, the development of secure drivers has been hindered because it requires modifying the driven hardware, for example by inserting a secret key shared with the driver. Such modification is expensive for hardware manufacturers.

Microsoft™ has indeed offered an operating system called NGSCB, which implements secure drivers as disclosed in the patent published under number US2005/091503. Nevertheless, not only does the technology implemented in that computer base require a modification of the driven hardware, either to encrypt/decrypt the data exchanged or to access a secure space, but also it implies that the inputs by the user always go through the host operating system of the machine, which constitutes an unsecured environment, representing a potential security breach, even if the information is encrypted, because of the fact that the host operating system is an unsecured environment which may for example destroy or not transfer the inputs. The same applies to the secure inputs covered by the patent document published under number EP1526425, which states that the secure input information that is intended to be managed by the secure kernel of the computer base, in practice the Nexus™, goes through a software stack of the host operating system of the machine.

As regards the technology called Terra™, which has been disclosed in the document titled "Terra: A Virtual Machine-Based Platform for Trusted Computing", Tal Garfinkel et al., Computer Science Department, Stanford University, it has not been implemented commercially, essentially for the reasons outlined above. Besides, that has been confirmed in the document, which states, in point 2.3, that "We have not implemented a secure user interface in our Terra prototype. We believe that implementing a secure UI that allows the capabilities of commodity graphics hardware to be utilized will require additional hardware and software support".

Besides, to secure the user interface, it is possible, according to a second approach, to add security indicators in the user interface. In a non-limitative example, this may take the form of a small padlock in a corner of the browser, a red box around a window and/or a special band at the top of the screen. Thus, a window or information entered on the keyboard are considered to be trusted if the security indicator is present. Such indicators are particularly disclosed in the international application published under number WO2007060322. One could also cite the architecture of the NetTop™ prototype disclosed in the document Tech Trend Notes, Vol. 9, Edition 4, autumn 2000, p. 1-8, or even the aforementioned Terra™ technology, which set aside part of the screen to specify which virtual machine is controlling the user interface.

In such an approach, security relies on the difficulty to guess all the indicators provided by the application and display an indicator at a specific location of the user interface. It is thus a practical approach, which is commonly used in the area of data processing, but which offers a lower level of security, because the display of an indicator in a window is potentially within the abilities of attackers with sufficient skills.

Lastly, to secure the user interface, it is possible, in a third approach, to duplicate the controllers of the user interface. Thus, if two applications A and B, which want to protect themselves from each other, each execute their own user interface controller, then the keyboard/screen events of application A are processed by the interface controller of application A and remain hidden from application B and vice versa.

That technique is used by the team researching operating systems at the Technical University of Dresden in its demonstration for securing graphics user interfaces. In that demonstration, a first interface controller, called Nitpicker™, is placed above the microkernel L4. It controls the graphical user interface for the applications of that microkernel. A second interface controller is placed in a particular application named L4 Linux, which is in fact the Linux operating system implemented in the form of an application above the microkernel L4. That particular application is thus seen to be an application of the microkernel L4, operating in user mode. The classic Linux windows manager is located in the application L4 Linux. The graphics events of the applications of the microkernel L4 are managed directly by the first Nitpicker™ interface controller and are hidden from the Linux applications and vice versa.

That third approach thus allows effective separation between applications. However, it requires duplicating the user interface controllers, which implies an increase in the code size, greater resource consumption and, of course, errors that need to be corrected in each of the controllers, meaning the provision of technical support.

In view of the above, one problem that the invention sets out to solve is the making of a system for securing a user interface comprising: one user interface managed by hardware peripheral devices; one or more applications using the user interface; one or more user interface hardware peripheral devices to interact with the said interface, where the said hardware peripheral devices are driven by driver software, which makes up for the drawbacks of the state of the technique and which, in particular, does not make it necessary to modify the hardware peripheral devices or duplicate the interface controllers, while demonstrating an adequate level of security, particularly in respect of malicious applications, which log keystrokes or use phishing.

The solution in the invention to the problem posed is first provided by a system for securing a user interface comprising:

a user interface comprising one or more hardware peripheral devices to interact with the said interface, the said hardware peripheral devices being driven by driver software;

one or more applications using the user interface;

characterised in that it further comprises:

a hypervisor with direct access to the user interface hardware peripheral devices;

one or more virtual machines that make it possible to execute the application or applications using the user interface, where the said virtual machines do not have direct access to the hardware resources of the user interface; and a securing software component comprising a frontend part controlled by the virtual machine or machines, where the said frontend part of the securing software is located in the said virtual machine or machines, and one main part controlled by the hypervisor, where the said main part of the securing software is located in the said hypervisor, the drivers of the user interface hardware peripheral devices are split into two parts, where one main part of the said drivers is placed under the control of the hypervisor and one fronted part of the said drivers is placed under the control of the virtual machines, and where the frontend part of the securing software component takes charge of managing the frontend part of the drivers and the main part of the securing software component takes charge of managing the main part of the drivers.

It further covers a method for securing a user interface, characterised in that it comprises the following stages:

provision of a user interface comprising one or more user interface hardware peripheral devices to interact with the said interface, where the said hardware peripheral devices are driven by driver software;

provision of a hypervisor and one or more virtual machines allowing the execution of one or more applications using the user interface, where the said virtual machines do not have direct access to the hardware resources of the user interface, and a securing software component comprising a frontend part controlled by the virtual machine or machines, where the said frontend part of the securing software is located in the said virtual machine or machines, and a main part controlled by the hypervisor, where the said main part of the securing software is located in the said hypervisor;

execution of an application of a virtual machine;

activation of a secure mode of the system at the request of the application;

secure display of information controlled by the main part of the securing software component, where the hypervisor has direct access to the user interface hardware peripheral devices; then deactivation of the secure mode of the system.

Advantageously, the user interface hardware peripheral devices comprise at least one user information input device and a screen;—the main part of the software component is capable of displaying and controlling the display of a component of the graphical interface in the user interface, for the entry of information by the user;—the main part of the software component is capable of validating identification and/or authentication information entered by the user;—the information exchanged between the main part of the securing component and the frontend part of that component is made secure by means of encryption and/or signing keys;—information exchanged between the frontend part of the securing software component and an application of the virtual machine comprising that frontend part is made secure by means of encryption and/or signing keys;—the method further comprises the following stages, where: the application requires the entry of user information, the entry request is sent to the main part of the software component, a graphical information input component is displayed under the direct control of the securing software component, the user enters user information and the user information is validated;—the user information is validated by the main part of the securing software component, or is sent back to the frontend part of the said component or even to the requesting application for validation;—the user information is validated against the data stored in the memory of the main part of the securing software component;—the application requires the establishment or updating of information stored in the memory of the securing software component, in that the information is entered by the user, and in that it is recorded in the main part of the securing software component; and—the method further comprises the following stages where: the application requires the secure display of information, the display request is sent to the main part of the software component and the information is displayed under the direct control of the said software component.

The invention will become clearer in the non-limitative description below, which will follow modes of embodiment of the invention, by reference to drawings where:

This invention relates to systems for securing a user interface.

The systems according to the invention are intended to be implemented, in particular but not exclusively, in embedded type devices, which often have limited hardware resources when compared to those of computers, particularly of the personal computer type. They may however concern such computers as well. The embedded devices that are particularly targeted by this invention are portable devices made in large manufacturing runs such as smart cards for use with smart card readers that are in turn connected to a terminal, mobile telephones, possibly with subscriber identification modules and having screens, personal digital assistants or any other small electronic devices that handle digital data. The embedded devices according to the invention may or may not have a processor. They comprise at least one and sometimes several memories.

The systems according to the invention comprise a user interface comprising one or more user interface hardware peripheral devices, and one or more applications using the user interface.

The user interface is the interface through which a user of electronic equipment, for example a computer or an embedded system, dialogues with the equipment.

The user interface comprises one or more interface hardware peripheral devices, which are controlled by driver software. There is a variety of interface peripheral devices. Some devices are input devices, which are used to enter information into the machine. Other devices are output devices, which make it possible to obtain information from the machine. Yet other interface peripheral devices are input/output devices, which make it possible to enter information into the machine and obtain information from the machine.

Input devices particularly include keyboards, mice or other pointing devices, PIN pads, smart card readers, graphic tablets and microphones. Output devices particularly include screens or speakers. Lastly, input/output devices particularly include touch screens.

The applications using the user interface are varied applications that are at the origin of user interface events for the management of information entered by the user and/or the presentation of such information or other information to the said user. The information entered by the user particularly includes identification and/or authentication information. The applications issue miscellaneous requests such as display or entry requests. For example, an application may be a banking application, which allows users to access their bank accounts and make transfers.

The user interface hardware peripheral devices are devices that allow the user to interact with the said interface. They are driven by software drivers. These devices may for instance be keyboards, mice or screens, particularly touch screens.

Figure 1:
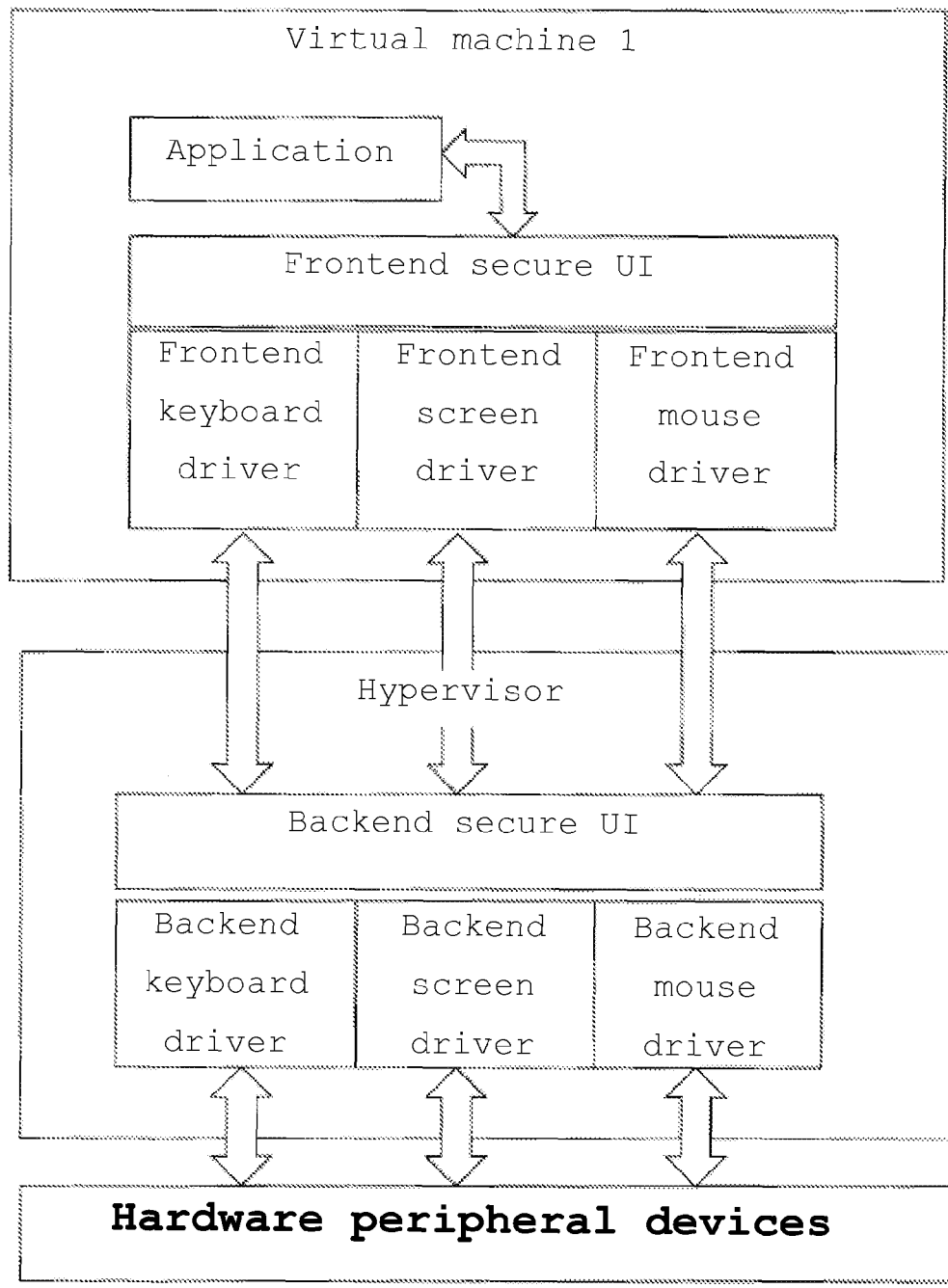
FIG. 1 is a schematic presentation of the system according to the invention.

As shown in FIG. 1, the system according to the invention further comprises a hypervisor, one or more virtual machines and a securing software component, called Secure UI in this figure.

The hypervisor or privileged domain is a software layer that allows the execution of one or more virtual machines above the said layer. The hypervisor has direct access to the hardware resources of the user interface, and particularly the devices. In the invention, it is the only entity with such direct access to those resources. Indeed, the virtual machines do not have direct access to the hardware resources. They do not have that privilege.

The virtual machines include a so-called guest operating system that is specific to them and at least one application using the user interface. They make it possible to execute the application or applications.

The virtual machines have either indirect access to the hardware peripheral devices, or access that may look like it is direct but actually goes through the hypervisor. Thus, the so-called hardware accesses available to virtual machines, which are indirect accesses to the interface peripheral devices, are controlled and driven solely by the hypervisor. Further, the virtual machines do not communicate with each other. They are isolated from one another.

Different virtualisation software architectures are known that may be used in the system according to the invention. For example, this may be the Xen™ virtualisation architecture developed by Cambridge University (UK) or the VMWare™ virtualisation architecture. In the Xen™ architecture, the hypervisor, which ultimately makes up a particular virtual machine, is the domain zero (dom0). It separates and isolates the virtual machines, where each virtual machine corresponds with a specific domain, domU, which does not have the privileges of dom0. Indeed, the privilege of physical access to the devices is delegated by the domU virtual machines to the hypervisor.

In the invention, the drivers of the user interface hardware peripheral devices are split into two parts. A large part of the said drivers is placed and runs in the hypervisor, or under the control of the said hypervisor. This is the part that physically manages accesses to the devices. Another part, which is smaller in size, is placed and runs in each virtual machine, or under the control of each virtual machine. That other part acts as a relay to the part of the driver located in the hypervisor. The part of the driver contained in the hypervisor is called the main part of the driver or the backend driver in FIG. 1. The part of the driver located in the virtual machines is called the frontend part of the driver or the frontend driver in FIG. 1.

The securing software component according to the invention (Secure UI) is a component of the user interface designed for securing that interface. This component comprises a frontend part or Secure UI frontend, controlled by the virtual machine or machines and a main part or Secure UI backend, controlled by the hypervisor. The frontend part of the securing software is included, i.e. integrated into the virtual machine or machines. The main part of the securing software is included or integrated into the hypervisor. That component manages the drivers of the hardware peripheral devices of the interface, i.e. for example the drivers of the keyboard, screen, mouse or PIN pad. The component may be considered to be a driver component of the drivers of the user interface hardware peripheral devices. The main part of the driver interacts with the user interface peripheral devices.

Figure 2:
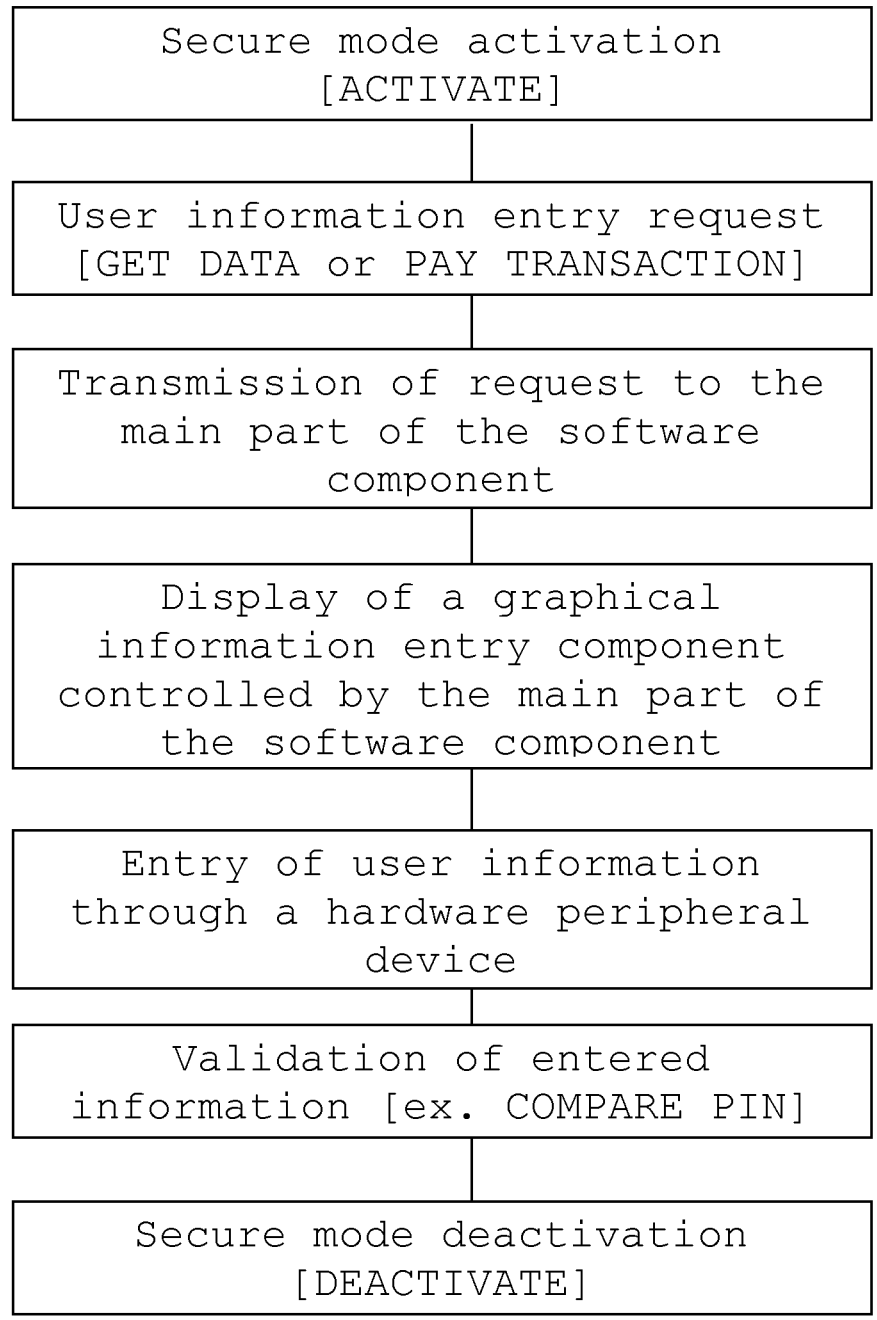
FIG. 2 is a diagram illustrating the different stages of the method according to the invention for the secure entry of information in a graphical component.
Figure 3:
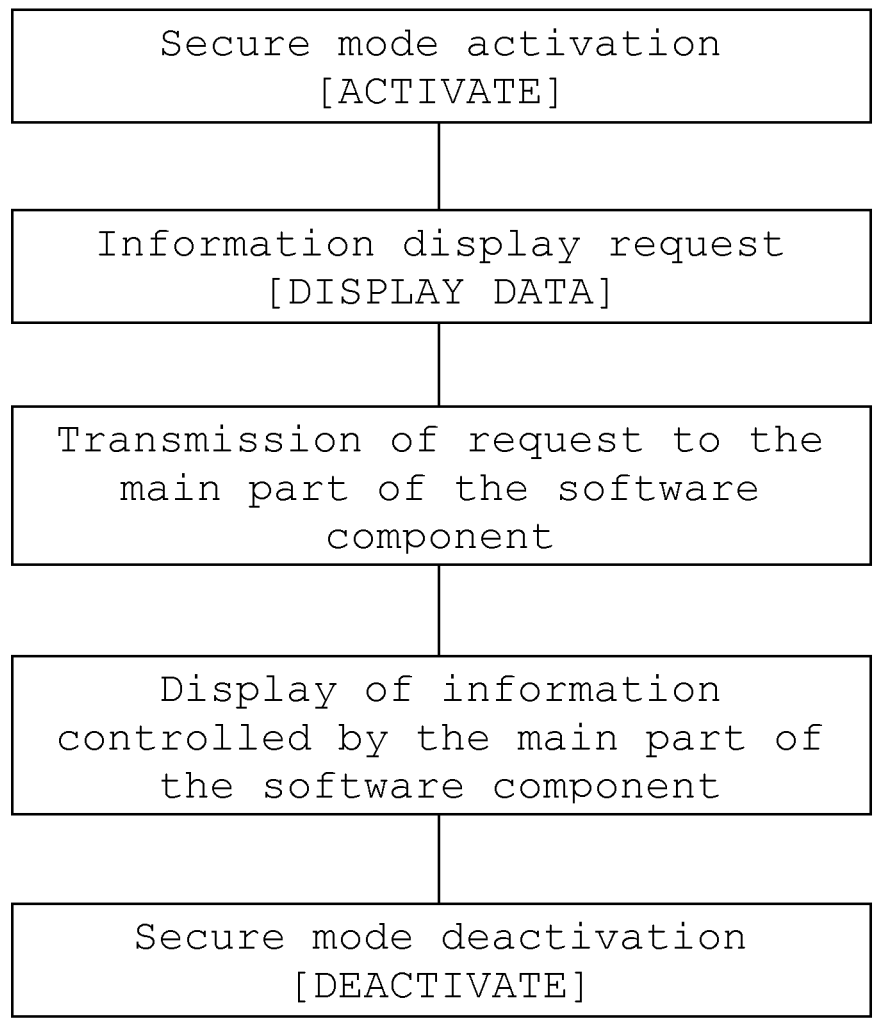
FIG. 3 is a diagram illustrating the different stages of the method according to the invention for the secure display of information.

Now, by reference to FIGS. 2 and 3, it can be seen that for securing the user interface, a virtual machine of a system according to the invention first activates the frontend part of the securing software component of the user interface. A securing context is then created and a variety of data are noted such as the identifier of the virtual machine. From that point on, the user interface is in so-called secure mode.

When, in that secure mode, an application A of the aforementioned virtual machine wishes to authenticate a user, for example through the entry of a password or a Personal Identification Number (PIN), it notifies the frontend part of the securing software component of its request. That frontend part of the component sends the request to the main part of the component of the hypervisor. That part can then decide to display or not on the screen, a graphical interface component, more specifically a trusted window, for entering the password or the PIN. If it decides to display that graphical component, the hypervisor accesses the card or the graphical component of the interface directly. More particularly, the main part of the securing software component retrieves the frame buffer of the relevant virtual machine and inserts the display of the graphical interface component for entering the password or the PIN number by calling the driver of the card or the graphical component to provide the display. A window is then displayed on the screen of the user interface. The user can then enter his/her password or PIN, for example, with the help of the keyboard or a PIN pad.

When the password or PIN is entered, the keyboard or PIN pad driver is used. The information entered is directly sent to the main part of the security software component of the user interface.

In that case, either the main part of the component validates the password itself or the said password is sent to the frontend part of the security component.

In order for the main part of the component to validate the password, that part merely has to save the expected passwords or their hash for each application of each virtual machine. Depending on the comparison between the password or PIN entered by the user and the password or PIN saved in the main part of the securing software component, that main part sends the frontend part a validation agreement (OK) or rejection (NOK). At the end, the frontend part of the component forwards the agreement or rejection to the requesting application.

If the main part of the security software component sends the password to the frontend part of this component, the latter can in its turn validate the password/PIN or send it to the application in order for it to validate it.

Thus, according to the invention, the requests and information exchanged in the systems are secured, because they necessarily go through the two parts of the securing component.

In the secure mode, an application B, for example a malicious application, contained in the virtual machine comprising the application A or in another virtual machine, cannot modify the display of the graphical component for entering the password or modify the entry of the password. Indeed, the display of the graphical component and the entry of information by the user are entirely managed by the securing software component, within the hypervisor. That is the component that decides to display a graphical component for the entry of the password/PIN and directly accesses the hardware resources for the display. That is the software component that decides the size and shape of the graphical entry component. That securing software component receives the events entered by the user and manages the information. The virtual machines cannot access the frame buffer or the information entered in the hardware peripheral devices of the graphical interface. Neither can they short-circuit the hypervisor, because they do not have direct access to the hardware peripheral devices. In that way, the intention effectively secures interaction between users and the machine.

The securing software component can respond to the following commands, most of which are included in the aforementioned FIGS. 2 and 3.

The ACTIVATE command, issued by an application, which makes it possible to create a securing context between a virtual machine, or an application of a virtual machine. It is thus the command that makes it possible to go into the secure mode.

The DEACTIVATE command makes it possible to change from the secure mode to the unsecure mode. Thus, when this command is called, the user interface is no longer secure. It must be noted that the secure context can only be deactivated by the component that has commanded the activation of the secure mode. That component can be authenticated by using a shared signing key while creating the context.

The GET_DATA command is a command that may be issued by the application that requires the entry of data such as a PIN, a password, an identifier or miscellaneous data, and which is intended for the securing software component. The information obtained following the execution of the command is sent encrypted and signed to the frontend part of the securing software component, or the requesting application, in case keys have been shared.

The DISPLAY_DATA command is a command that requires the display of information in a trusted window. In response to this command, the information is sent by the frontend part of the securing software component, or the application, to the main part of the component, and then it is displayed in the user interface under the control of the hypervisor. The main part of the securing software component, which is executed in the hypervisor, controls the formatting of the information. In particular, the hypervisor may display the provenance of the said information.

Besides, commands specific to the entry of passwords, PIN numbers or other identification or authentication information are liable to be implemented in the method according to the invention.

First of all, these include the COMPARE PIN command, which is required when the application requires the entry of a PIN or some other identification or authentication information. The information is validated by comparing it in the main part of the securing software component, which is executed in the hypervisor. The validation or absence of validation of the authentication is sent, for example, encrypted and signed, to the frontend part of the securing software component, or even the requesting application, if keys have been shared to that end with the application. The entry of information under the control of the securing software component, which is executed in the hypervisor, is likely to be carried out through a keyboard, by means of a mouse or by clicking a PIN pad, particularly of the type containing a window with visual keys which the user must click.

The commands also include the SET PIN command by which an application, which is sending the command, requires the updating of identification or authentication information in the memory of the main part of the securing software component, which is executed in the hypervisor. Indeed, the identification and authentication information is validated, in the main part of the securing software component, against data stored in the memory of the component. The command thus authorises the modification of the data stored in the memory of the main part of the software component. It may be invoked first by any application, if the application requires the establishment of comparison information in the memory of the software component. Then, the information may only be modified by that any application if the information stored in the memory is presented and validated.

The commands finally include the PAY TRANSACTION command by which an application requires payment for a given transaction. In that case, the main part of the securing software component, which is executed in the hypervisor, activates a specific device such as a smart card reader, requires the entry of an identification code, validates the code entered or does not do so and sends the information about the validation or otherwise to the frontend part of the securing software component, even the requesting application, if keys have been shared to that end.

It must be noted that the securing of the system according to the invention may advantageously be reinforced by securing the communication channel between the main part of the securing software component and its frontend part. In that case, at the time of the creation of the securing context, signing and/or encryption keys are shared between the main and frontend parts of the component. The keys are used to secure the requests and responses that go through these parts. In particular, if identification information is validated by the frontend part of the component, the information is transmitted securely, encrypted and/or signed in the communication channel. Indeed, if the information is signed and/or encrypted, it cannot be modified and/or read by third-party virtual machines.

The securing of the system according to the invention may further be advantageously reinforced by securing communication between the frontend part of the securing software component and the application or each application of the virtual machine comprising the part. In that case, encryption and/or signing keys are shared between that frontend part and the secure application. These keys are used to encrypt and/or sign the messages moving between the two entities, particularly identification or authentication information if the information needs to be validated by the application itself. The other applications of the virtual machine cannot read and/or modify the information intended for the requesting application.

The invention claimed is:

1. A system for securing a user interface comprising:
a user interface hardware peripheral device to interact with a user interface, where the user interface hardware peripheral device is driven by driver software;
a plurality of applications using the user interface;
a hypervisor having direct access to the user interface hardware peripheral device;
a plurality of virtual machines each allowing the execution of the applications using the user interface, where the virtual machines do not have direct access to the hardware peripheral device; and
a user interface securing software component comprising a frontend part controlled by the virtual machines, where the frontend part of the securing software is located in the virtual machines, and a main part controlled by the hypervisor, where the main part of the securing software is located in the hypervisor wherein the user interface securing component secures an interaction between a user and the user interface by marshalling the interaction over the main part and the frontend part,
the driver software is split in two parts, where one main part of the driver software is placed under the control of the hypervisor, a frontend part of the driver software is placed under the control of the virtual machines, the frontend part of the securing software component manages the frontend part of the driver software, the main part of the securing software component manages the main part of the driver software and an application of the plurality of applications located in a given one of the plurality of virtual machines accesses the user interface via the frontend of the securing software and the frontend of the driver software also located in the given one of the plurality of virtual machines.

2. The system according to claim 1, wherein the user interface hardware peripheral devices comprise at least one user information input device and a screen.

3. The system according to claim 1, wherein the main part of the user interface software component comprises logic for displaying and controlling the display of a graphical interface component in the user interface, for the entry of information by the user.

4. The system according to claim 1, wherein the main part of the user interface software component comprises logic for validating identification and/or authentication information entered by the user.

5. The system according to claim 1, wherein the information exchanged between the main part of the securing component and the frontend part of that component is secured with the help of encryption and/or signing keys.

6. The system according to claim 1, wherein the information exchanged between the frontend part of the securing software component and an application of the virtual machine comprising that frontend part is secured by means of encryption and/or signing keys.

7. A method for securing a user interface, comprising the following stages:
provision of a user interface hardware peripheral device for interacting with a user interface, where the user interface hardware peripheral device is driven by driver software;
provision of a hypervisor and of a plurality of virtual machines allowing the execution of a plurality of applications using the user interface, where the virtual machines do not have direct access to the hardware peripheral device, a securing software component comprising a frontend part controlled by the virtual machines, where the said frontend part of the securing software is located in the virtual machines, and a main part controlled by the hypervisor, where the main part of the securing software is located in the said hypervisor wherein the user interface securing component secures an interaction between a user and the user interface by marshalling the interaction over the main part and the frontend part, and the driver software of the user interface is split in two parts, where one main part of the driver software is placed under the control of the hypervisor, a frontend part of the driver software is placed under the control of the virtual machines, the frontend part of the securing software component manages the frontend part of the driver software, the main part of the securing software component manages the main part of the driver software and an application of the plurality of applications located in a given one of the plurality of virtual machines accesses the user interface via the frontend of the securing software and the frontend of the driver software also located in the given one of the plurality of virtual machines;
execution of an application of a virtual machine;
activation of a secure system mode upon a request from the application;
secure display of information controlled by the main part of the securing software component, where the hypervisor directly accesses the user interface hardware peripheral devices; then
deactivation of the secure system mode.

8. The method according to claim 7, wherein:
the application requires the entry of user information;
the entry request is transmitted to the main part of the software component;
an information entry graphical component is displayed under the direct control of the securing software component;
the user enters user information;
and
the user information is validated.

9. The method according to claim 8, wherein the user information is validated by the main part of the securing software component, or is sent to the frontend part of the said component or even the requesting application, for validation.

10. The method according to claim 9, wherein the user information is validated against data stored in the memory of the main part of the securing software component.

11. The method according to claim 10, wherein the application requires the establishment or updating of information stored in the memory of the securing software component, in that the information is entered by the user, and in that it is recorded in the main part of the securing software component.

12. The method according to claim 8, further comprising the following stages, where:
- the application requires the secure display of information;
- the display request is sent to the main part of the software component; and
- the information is displayed under the direct control of the said software component.

* * * * *